United States Patent [19]
Kuhn et al.

[11] Patent Number: 5,510,996
[45] Date of Patent: Apr. 23, 1996

[54] METHOD FOR DETERMINING AUXILIARY POSITION-CONTROL PARAMETERS

[75] Inventors: Thomas Kuhn, Erbach-Erlenbach; Wolfgang Grimm; Matthias Beck, both of Michelstadt, all of Germany

[73] Assignee: Robert Bosch GmbH, Stuttgart, Germany

[21] Appl. No.: 75,539

[22] PCT Filed: Nov. 15, 1991

[86] PCT No.: PCT/DE91/00891

§ 371 Date: Jun. 14, 1993

§ 102(e) Date: Jun. 14, 1993

[87] PCT Pub. No.: WO92/10797

PCT Pub. Date: Jun. 25, 1992

[30] Foreign Application Priority Data

Dec. 12, 1990 [DE] Germany .................. 40 39 620.7

[51] Int. Cl.$^6$ .................................................. G05B 19/00
[52] U.S. Cl. ................ 304/474.28; 364/474.31; 364/474.12; 318/567; 318/568.22
[58] Field of Search ............. 364/474.28, 474.29, 364/474.3, 474.31, 474.32, 474.34, 148, 59–165, 474.02, 474.11, 474.12, 474.14; 318/573, 564, 567, 568.18, 568.22, 568.24, 615, 616, 617, 619

[56] References Cited

U.S. PATENT DOCUMENTS

| | | | |
|---|---|---|---|
| 4,695,960 | 9/1987 | Reimann et al. | 364/474.02 |
| 4,825,055 | 4/1989 | Pollock | 364/164 X |
| 4,906,908 | 3/1990 | Papiernik et al. | 364/474.35 X |
| 5,037,252 | 8/1991 | Hasegawa et al. | 364/474.02 X |

FOREIGN PATENT DOCUMENTS 61-122720A 6/1986 Japan .

OTHER PUBLICATIONS

"Zeitschrift für industrielle Fertigung" (Journal for industrial Manufacturing), 1978, pp. 329–333.

Von Klaus Mezger et al, "Kleinste Schlepp–und Bahnfehler in NC–Systemen", *Technische Rundschau*, vol. 81, No. 36, Sep. 8th, 1989, pp. 164–167.

*Primary Examiner*—Roy N. Envall, Jr.
*Assistant Examiner*—Brian C. Oakes
*Attorney, Agent, or Firm*—Spencer & Frank

[57] ABSTRACT

A method is proposed for determining parameters for the auxiliary control of the position guidance variable of an axis of a numerically controlled machine path. If the auxiliary control parameters up to the $n^{th}$ order are known for the i-th axis, auxiliary control parameter of the order of n+1 can be determined by predetermining a guidance variable signal in the form of a parabola of the order of n+1 for the axis. By including the amplification (K) of the control unit (11) and the n+1-th derivation of the guidance variable signal over time, a auxiliary control parameter of the order of n+1 can be determined from the steady-state error which occurs.

7 Claims, 3 Drawing Sheets

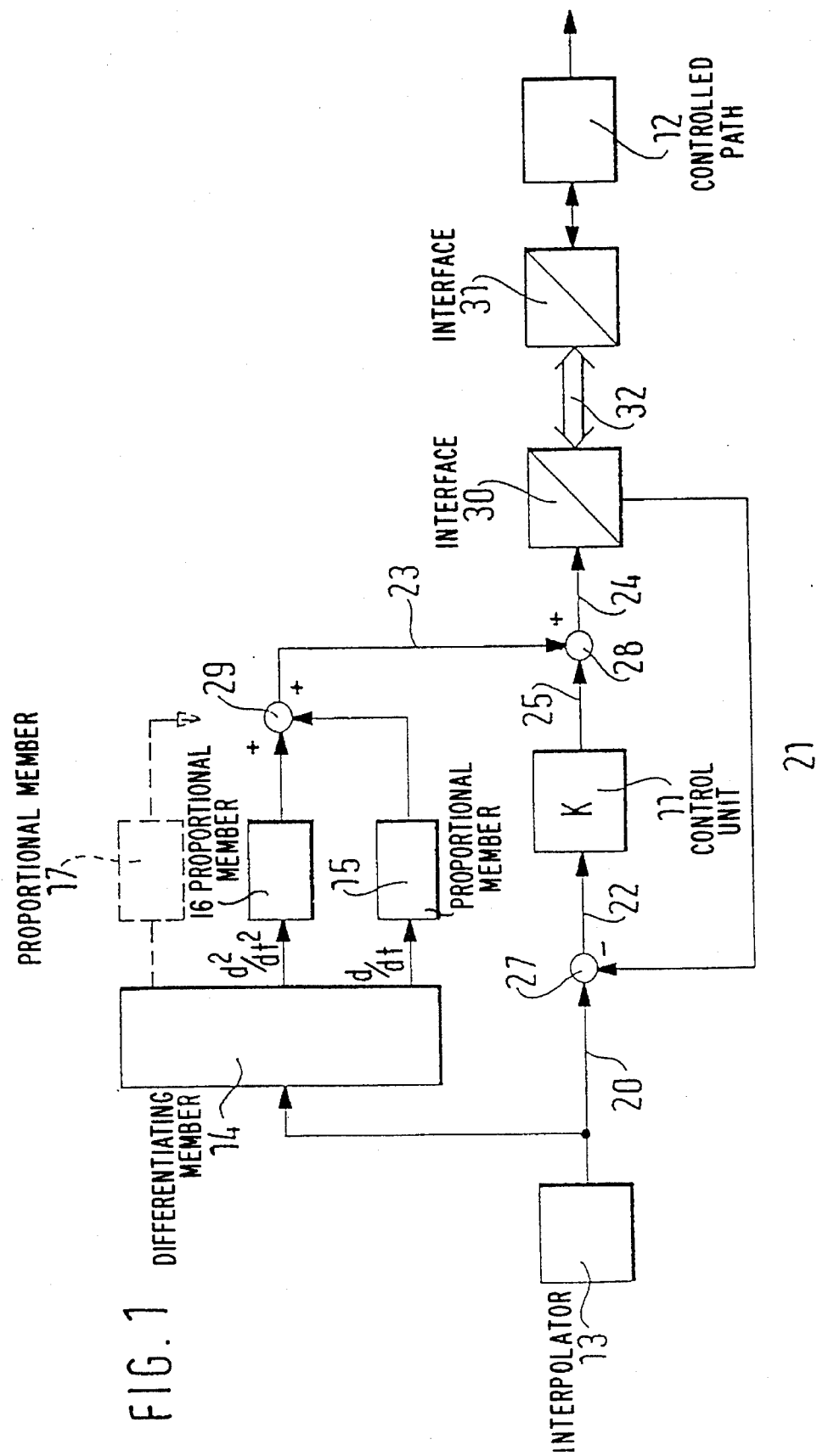

METHOD FOR DETERMINING AUXILIARY POSITION-CONTROL PARAMETERS

BACKGROUND OF THE INVENTION

The invention is based on a method for increasing the precision of paths in numerically controlled machine tools, and more particularly to a method of determining a parameter for auxiliary control in a position control loop of the numerically controlled path of a machine having i axes. One proposal for increasing path precision by superimposing auxiliary values is known from "Zeitschrift für industrielle Fertigung" (Journal for Industrial Manufacturing), 1978, Pages 329 to 333. This reference describes a plurality of possibilities for influencing the guidance variable of the position control of a machine tool. In this prior art method of auxiliary control, the desired position signal is supplemented by adding suitably weighted control signals. The particular goal of the arrangements proposed in the Journal for Industrial Manufacturing, 1978, Pages 329–333 is to improve path precision while travelling through a corner. With respect to the superimposition of auxiliary values, the reference is limited to the possibility of auxiliary control of speed, i.e., superimposing an auxiliary signal that is proportional to the guidance speed. Auxiliary control of the accelerated guide speed, i.e., superimposing an auxiliary value in the form of an acceleration signal proportional to guidance acceleration or greater derivations of the guidance variable, is not provided. This reference does not give any information on how the auxiliary control parameters required for carrying out the auxiliary control for greater derivations of guidance variables can be obtained.

EP 0,184,036 also discloses a control method for NC machines that employs the auxiliary control method. Moreover, NC (numerically controlled) control units are available commercially, for example, from the FANUC and OSAI companies of Japan, which also use the auxiliary speed control method. The parameters required for auxiliary control in this case are exactly predetermined or they are set empirically for each machine.

SUMMARY OF THE INVENTION

It is the object of the present invention to provide a method which permits the systematic determination of auxiliary control parameters for any desired machine.

This objective is attained by a method in which: a position value changing over time in the form of a ramp is given as a guidance variable for the position control of the i-th axis; the steady-state error of the i-th axis between the guidance variable and the actual position value is detected; a speed auxiliary control parameter is derived from the steady-state error; and the speed auxiliary control parameter is transferred to a control unit. The method is not machine specific and may be used for any desired machine. It can be carried out without performing an expensive identification of the control path. In addition to determining a parameter for the auxiliary control of the speed in a simple manner, it permits further parameters for auxiliary control of acceleration and for auxiliary control of jolts to be obtained, and it may also be used on any desired position control path. It can advantageously be performed automatically and it is particularly suitable for implementation in a microcomputer. The structure of the evaluation algorithm is simple, which makes it possible to incorporate it into very cost-effective control units. Another advantage is that for the auxiliary control of greater derivations of the position guidance variable by way of the auxiliary control parameters obtained according to the invention for a great number of different position control paths, the lag error becomes nearly zero, even in the dynamic movement state. Another advantage of the method is that it can be executed very rapidly. The method according to the invention is described in more detail in the specification below and by way of the drawing.

BRIEF DESCRIPTION OF THE DRAWINGS

FIG. 1 shows a block diagram of an arrangement for carrying out the method according to the invention on one axis;

FIGS. 2a and 2b show position guidance variables employed for determining the auxiliary control parameters as a function of.

DESCRIPTION OF THE PREFERRED EMBODIMENTS

Figure 2A:
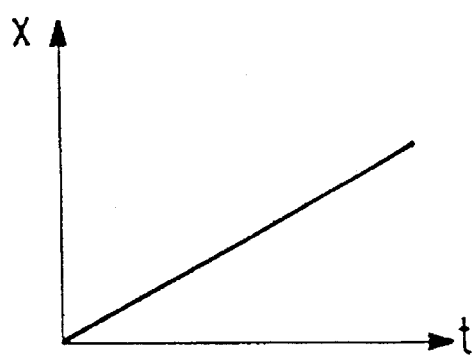

The block diagram shown in FIG. 1 contains a position control loop, including an interpolator 13, a control unit 11, interfaces 30, 31, and a controlled path or system 12, as well as an arrangement which performs auxiliary control of a position guidance variable. This arrangement includes a differentiating member 14 and a plurality of proportional members 15 to 17. Further proportional members arranged parallel to blocks 15 to 17 may be provided but are not shown in FIG. 1.

The controlled path 12 encompasses one of the i axes of a machine tool and the associated drive(s). Controlled path 12 is only shown in principle. It may contain further cascaded control loops, for example, a rotational speed control circuit. The transmission factors of proportional members 15 to 17 are externally adjustable. To accomplish this, they are advisably provided with memory means in which values for proportional factors are stored. The control value is the actual position value 21, and the command or guidance variable is a signal 20 produced in interpolator 13. A differential signal 22 formed by the difference of guidance variable 20 and the actual value 21 is amplified in control unit 11. The control unit is usually a proportional control unit having an amplifying factor K. An auxiliary control signal 23 is added to the output signal 25 of the control unit at a summing point 28. The auxiliary control signal 23 and the control unit output signal 25 form a guide signal 24, which is fed to control path 12 by way of a drive interface 30 on the control unit side, and interface 31 on the drive side. Data transmission between interfaces 30 and 31 is preferably accomplished in digital form. The actual position value 21 is fed back from the output of control path 12 via interfaces 31 and 30 to summing point 27. The guidance variable signal 20 is simultaneously fed to differentiating member 14. The latter creates time derivatives $d/dt$, $d^2/dt^2$, etc., of guidance variable signal 20 and feeds those in increasing order of derivation to proportional members 15, 16, 17, etc. The output signals of proportional members 15, 16, 17, etc., are combined at summing point 29 and form auxiliary control signal 23.

Function blocks 11 and 13 are usually realized in the form of a computer program in a micro-computer. Blocks 14 to 17 are also preferably realized in the form of a program in the same computer. A control arrangement having the structure shown in FIG. 1 is provided for each axis of the machine tool.

The implementation of the method for determining auxiliary control parameters is elucidated in more detail in the following paragraph.

The method is implemented individually axis by axis for each one of the i axes of the machine. The respective axis to which the method is applied is hereinafter referred to as the "i-th axis." The remaining axes are switched to be passive. To determine the auxiliary parameters, the auxiliary control is initially turned off. Signal 23 thus initially equals zero. In a first method step, a position guidance variable signal 20 which, seen as a function of time, is ramp shaped, is generated by interpolator 13 for the i-th axis of the machine. FIG. 2a depicts a basic example of a suitable signal. The position x (ordinate) is plotted over the time t (abscissa). The i-th axis triggered by this signal thus moves on a straight positioning line which changes at a constant speed. Signal 20 is maintained until system 12, i.e., the i-th axis, is in the steady state and a constant deviation 22 between the desired and actual position sets in. The value of the steady-state error 22 is multiplied by the amplification factor K of control unit 11 and is divided by the value V of the slope of the ramp of guidance variable signal 20. To accomplish this, the value V of the slope of the ramp is determined in the differentiating member 14 by differentiation of the guidance variable signal curve (FIG. 2a) over time. The result obtained by multiplication and division is stored in the memory of proportional member 15. The value obtained in this manner represents a first auxiliary control parameter for the i-th axis, hereinafter called the speed auxiliary control parameter.

Subsequent to determining the speed auxiliary control parameters for the i-th axis, a second auxiliary control parameter is determined for the same axis in a subsequent second part of the method. The condition for carrying out the second method step is that the speed auxiliary control parameter be already known. For the second method step, the auxiliary control is activated for the i-th axis. However, only the proportional member 15 is activated with the speed auxiliary control parameter known from the first method step. The further proportional members 16, 17, etc., remain inactive. An auxiliary control signal 23 weighted with the speed control auxiliary parameter is present at the output of summing point 29. Further parts of the method for determining the second auxiliary control parameter are in principle analogous to the realization of the first part of the method. Interpolator 13 produces a time-variant guidance value signal 20 for the i-th axis. As a function of time, this has the shape of a parabola of second order in the second part of the method. Such a signal is qualitatively shown in FIG. 2b; position x is plotted over time axis t. This signal is again maintained until the excited system 12, i.e., the i-th axis, reaches the steady state and a steady-state error 22 sets in. The value of the steady-state error is again multiplied with the amplification K of the control unit, is divided by the value of the curvature a of guidance variable signal 20, which is determined by two-time differentiation of guidance variable signal 20 according to the time in differentiating member 14, and is read into the memory of second proportional member 16. The value that is formed represents the second auxiliary control parameter, hereinafter called the acceleration auxiliary control parameter.

The basic procedure for determining the two first auxiliary control parameters may subsequently be successively repeated in the same sense for the i-th axis for any desired number of further auxiliary control parameters of a higher order. A third auxiliary control parameter, which corresponds to a jolt auxiliary control, can thus be determined by first activating, in addition to the first proportional member 15, the second proportional member 16 for which the proportionality factor was determined in the second part of the method. An auxiliary control signal 23 is thus present at the output of summing point 29. This signal comprises a component proportional to the speed, which is weighted with the speed auxiliary control parameter, and a component proportional to the acceleration, which is weighted with the acceleration auxiliary control parameter. The interpolator produces a guidance variable signal 20 which, as a function of time, has the shape of a parabola of third order. The guidance variable signal 20 is emitted until the i-th axis is in the steady state and a constant deviation 22 occurs. The value of the deviation 22 is again multiplied by the amplification of control unit 11, is divided by the value of the third derivative of the desired value, which is formed in differentiating member 14, and is read into the memory of proportionality member 17. The value obtained in this manner represents the third auxiliary control parameter.

By repeating the process, further auxiliary control parameters of a higher order may be determined. The advantage of using auxiliary control parameters of a higher order is that through them, the lag distance decreases progressively for any desired guidance variable signals occurring during normal operation of the machine. However, in practice it will generally be sufficient to determine a speed auxiliary control parameter, an acceleration auxiliary control parameter and a jolt auxiliary control parameter.

The method for determining auxiliary control parameters for one, namely the i-th axis, is subsequently repeated for each further axis.

The auxiliary control parameters determined for all axes are transferred unchanged into the numerical control for the normal operation of the machine. A new determination of the auxiliary control parameters is required only if the controlled path of the machine tool is changed. This could be the case, for example, after mechanical alterations were made to the drive of an axis.

Figure 3:
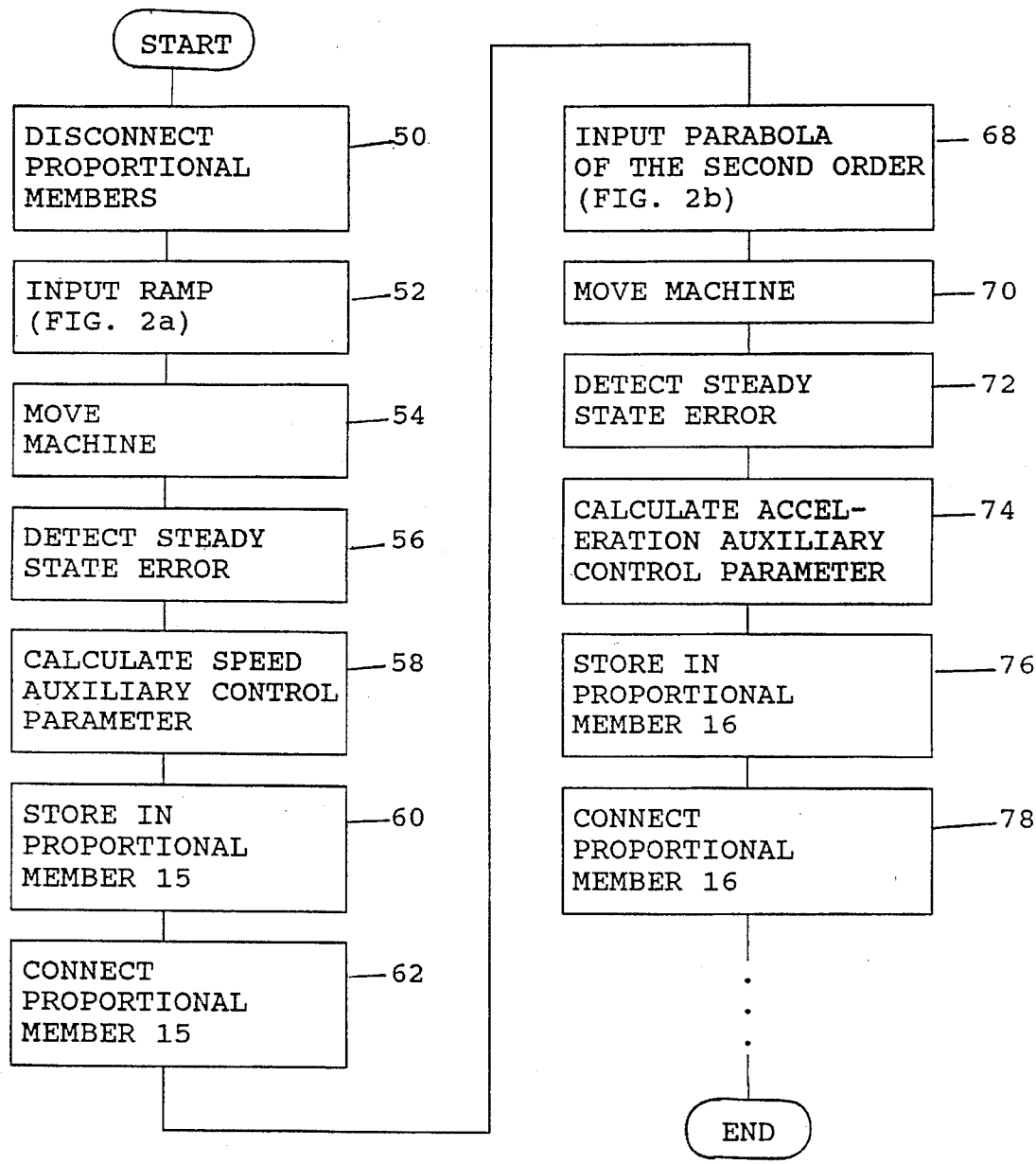
FIG. 3 is a flow chart illustrating how the proportional members in FIG. 1 are initialized.

As was noted previously, function blocks 14–17 are preferably implemented by a computer (not shown). FIG. 3 illustrates a flow chart for initialling the proportional members 15–17 for the i-th axis of a machine tool when such a computer is employed.

In step 50, proportional members 15–17 are disconnected from summing point 29. In step 52, interpolator 13 emits a ramp signal as the guidance variable signal 20, thereby commanding the machine to move at a constant velocity (step 54). However, the actual movement of the machine tool typically lags behind the instantaneous value of the guidance variable signal 20. The error between the actual position of the machine tool and the command position reaches a steady state which is detected in step 56. The speed auxiliary control parameter is calculated in step 58 by dividing the steady-state error by the command velocity (that is, the first derivative with respect to time of the ramp signal that has been provided as guidance variable signal 20) and multiplying the quotient by the same amplification factor K that is employed by control unit 11. The result is stored (step 60) in proportional member 15, which is then connected to summing point 29.

Figure 2B:
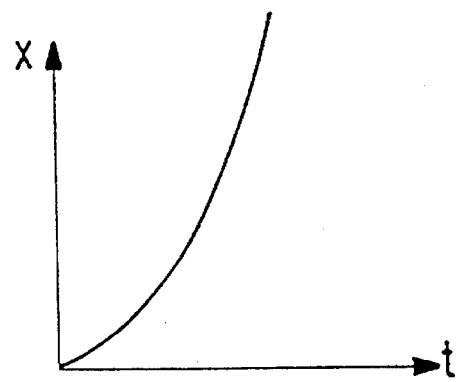

The auxiliary control parameter for acceleration is found in much the same way. This time, however, the guidance variable signal 20 emitted by interpolator 13 (step 68) is a parabola of the second order as shown in FIG. 2b rather than a ramp (i.e., it varies quadratically rather than linearly with time). The machine tool moves under the stimulus of this input signal (step 70) until a steady-state error sets in. This is detected in step 72. The acceleration auxiliary control parameter is calculated in step 74. This calculation is the same as the calculation in step 58 except that the second time derivative of the guidance variable signal rather than the first time derivative is used. That is, the acceleration control parameter is calculated by dividing the steady-state error that was detected in step 72 by the second derivative of the input signal that was supplied in step 68 and the quotient is multiplied by the amplification factor K of the control unit 11. The result is stored in proportional member 16. The proportional member 16 is connected to summing point 29 in step 78 prior to determination of the jolt auxiliary control parameter and any other higher order auxiliary control parameters that may be desired. This is indicated schematically in FIG. 3 by the three dots following step 78. The jolt auxiliary control parameter, for example, is determined by driving the machine tool using a parabola of the third order as the input signal, dividing the steady-state error which results by the third derivative of this input signal, and multiplying the quotient by the factor K.

After the system has been initialized in the foregoing manner the stored auxiliary control parameters are available for use during actual machining. The guidance variable signal 20 is supplied not only to summing point 27 but also to differentiating member 14, which in turn supplies the first derivative with respect to time of the signal 20 to proportional member 15 (which stores the speed auxiliary parameter), supplies the second derivative with respect to time of the signal 20 to proportional member 16 (which stores the acceleration auxiliary control parameter), and so forth. The stored auxiliary control parameters can the be used to generate weighted signals which are added at summing point 29 to form an auxiliary control signal 23 which supplements the output signal 25 of control unit 11.

A prerequisite for realizing the method according to the invention is that the individual axes of the machine tool be sufficiently decoupled and also, that each individual axis demonstrates a linear transmission behavior. If this prerequisite is observed, the method may be employed for any desired system. Knowledge of the precise transmission behavior of the machine tool and its individual components is not necessary. The method is particularly suitable for implementation in a microcomputer which is part of a numerically controlled machine tool anyway. It is particularly recommended to provide for an automated performance of the method, which is carried out automatically upon activation of the machine tool.

We claim:

1. A method of determining an acceleration auxiliary control parameter when a speed auxiliary control parameter is known so that the auxiliary control parameters can be used, in a system in which a guidance variable is supplied to a position control loop which generates a guide signal, having a first portion and a second portion, to control the position of a controlled path of a numerically controlled machine, to generate an auxiliary control signal which is supplied to the position control loop, said method comprising the steps of:

(a) supplying the position control loop with a guidance variable which changes over time in the form of a parabola of the second order;

(b) using the first time derivative of the guidance variable supplied in step (a) weighted by the known speed auxiliary control signal as the second portion of the guide signal;

(c) detecting the value of an error signal generated by the position control loop when the error signal reaches a steady-state, the error signal being proportional to the difference between the guidance variable and an actual position value, with the first portion of the guide signal being a function of the error signal;

(d) deriving the acceleration auxiliary control parameter at least in part from the steady-state error signal and a second time derivative of the guidance variable supplied in step (a); and (e) storing the acceleration auxiliary control parameter.

2. A method according to claim 1, wherein the acceleration auxiliary control parameter is derived in step (d) by multiplying the steady-state error value by an amplification factor and dividing by the second derivative with respect to time of the guidance variable supplied in step (a).

3. A method for determining an n+1-th auxiliary control parameter after n auxiliary control parameters are known so that the n+1 auxiliary control parameters can be employed, in a system in which a guidance variable is supplied to a position control loop which generates a guide signal, having a first portion and a second portion, to control the position of a controlled path of a numerically controlled machine, to weight n+1 signals formed by differentiating the control variable n+1 times with respect to time, the weighted signals being combined to form an auxiliary control signal which is superimposed on the guide signal to provide auxiliary control of the dynamic behavior of the controlled path, said method comprising the steps of:

(a) supplying the position control loop with a guidance variable which changes over time in the form of a parabola of the order n+1;

(b) using the first time derivative of the guidance variable supplied in step (a) weighted by the known n-th auxiliary control signal as the second portion of the guide signal;

(c) detecting the value of an error signal generated by the position control loop when the error signal reaches a steady-state, the error signal being proportional to the difference between the guidance variable and an actual position value, with the first portion of the guide signal being a function of the error signal;

(d) deriving the n+1-th auxiliary control parameter at least in part from the steady-state error signal and a further time derivative of the guidance variable supplied in step (a); and (e) storing the n+1-th auxiliary control parameter.

4. A method according to claim 3, wherein the n+1-th auxiliary control parameter is derived in step (d) by multiplying the steady-state error value by an amplification factor and dividing by the n+1-th derivative with respect to time of the guidance variable supplied in step (a).

5. A method of determining an n+1-th auxiliary control parameter for weighing a signal which has been derived from a guidance variable supplied to a position control loop for a controlled path of a numerically controlled machine by differentiation with respect to time, if n auxiliary control parameters for weighing n other signals derived by differentiation with respect to time from the guidance variable are known, and wherein an auxiliary control signal is obtained from the weighted signals and superimposed on an error signal generated by the position control loop to provide auxiliary control of the dynamic behavior of the controlled path, said method comprising the steps of:

(a) supplying the position control loop with a guidance variable which changes over time in the form of a parabola of the n+1-th order;

(b) superimposing an auxiliary control signal having n components on the error signal, the n components being formed by weighing n signals with the n auxiliary control parameters that are known, the n signals being derived from the guidance variable by differentiation with respect to time;

(c) detecting the value of the error signal that is generated by the position control loop when the error signal reaches a steady-state; and (d) selecting a value which is a function of the steady-state error value as the n+ 1-th auxiliary control parameter; and wherein the n+ 1-th auxiliary control parameter is selected in step (d) by multiplying the steady-state error value by an amplification factor and dividing by the n+ 1-th derivative with respect to time of the guidance variable supplied in step (a).

6. A method of determining auxiliary control parameters for use in a system in which a member is moved in response to a guide signal having first and second portions, the first portion of the guide signal being a function of the difference between an actual position signal and a guidance variable signal which designates a command position for the member, and the second portion of the guide signal being determined from the guidance variable signal and the auxiliary control parameters, said method comprising the steps of:

(a) supplying a ramp signal as the guidance variable signal;

(b) setting the second portion of the guide signal to zero;

(c) detecting a steady-state error value between the guidance variable signal and the actual position signal;

(d) calculating a speed auxiliary control parameter on the basis of at least the steady-state error signal detected in step (c) and the first time derivative of the ramp signal supplied in step (a);

(e) storing the speed auxiliary control parameter;

(f) supplying a signal which changes over time in the form of a parabola of the second order as the guidance variable signal;

(g) using the first time derivative of the guidance variable signal supplied in step (f) weighted by the speed auxiliary control signal as the second portion of the guide signal;

(h) detecting a steady-state error value between the guidance variable signal supplied in step (f) and the actual position signal;

(i) calculating an acceleration auxiliary control parameter on the basis of at least the steady-state error value detected in step (h) and the second time derivative of the guidance variable signal supplied in step (f); and (j) storing the acceleration auxiliary control parameter.

7. The method of claim 6, further comprising the steps of:

(k) supplying a signal which changes over time in the form of a parabola of the third order as the guidance variable signal;

(l) using the sum of the first time derivative of the guidance variable supplied in step (k) weighted by the speed auxiliary control signal and the second time derivative of the guidance variable signal supplied in step (k) weighted by the acceleration auxiliary control signal as the second portion of the guide signal;

(m) detecting a steady-state error value between the guidance variable signal supplied in step (k) and the actual position signal;

(n) calculating a further auxiliary control parameter on the basis of at least the steady-state error value detected in step (m) and the third time derivative of the guidance variable signal supplied in step (k); and (o) storing the further auxiliary control parameter.

* * * * *